(12) United States Patent
Peterson

(10) Patent No.: US 7,487,504 B2
(45) Date of Patent: Feb. 3, 2009

(54) THREAD DISPATCH FOR MULTIPROCESSOR COMPUTER SYSTEMS

(75) Inventor: Ricky Merle Peterson, Mantorville, MN (US)

(73) Assignee: International Business Machines Corporation, Armonk, NY (US)

( * ) Notice: Subject to any disclaimer, the term of this patent is extended or adjusted under 35 U.S.C. 154(b) by 736 days.

(21) Appl. No.: 10/068,599

(22) Filed: Feb. 6, 2002

(65) Prior Publication Data

US 2003/0149716 A1    Aug. 7, 2003

(51) Int. Cl.
G06F 9/46 (2006.01)
G06F 15/173 (2006.01)

(52) U.S. Cl. ...................... 718/104; 709/226

(58) Field of Classification Search ......... 718/100–108, 718/1; 707/10; 712/1–300; 709/226
See application file for complete search history.

(56) References Cited

U.S. PATENT DOCUMENTS

| | | | | |
|---|---|---|---|---|
| 4,240,143 A * | 12/1980 | Besemer et al. | ............. | 710/104 |
| 4,245,306 A * | 1/1981 | Besemer et al. | ............. | 709/245 |
| 4,253,144 A * | 2/1981 | Bellamy et al. | ............. | 709/226 |
| 4,253,146 A * | 2/1981 | Bellamy et al. | ............. | 709/226 |
| 4,924,428 A * | 5/1990 | Vea | ............. | 714/1 |
| 5,050,070 A * | 9/1991 | Chastain et al. | ............. | 712/203 |
| 5,293,620 A * | 3/1994 | Barabash et al. | ............. | 718/102 |
| 5,301,324 A * | 4/1994 | Dewey et al. | ............. | 718/105 |
| 6,292,822 B1 * | 9/2001 | Hardwick | ............. | 718/105 |
| 6,505,229 B1 * | 1/2003 | Turner et al. | ............. | 718/107 |
| 6,658,449 B1 * | 12/2003 | Brenner et al. | ............. | 718/105 |
| 6,728,959 B1 * | 4/2004 | Merkey | ............. | 718/102 |
| 6,912,533 B1 * | 6/2005 | Hornick | ............. | 707/10 |
| 7,178,145 B2 * | 2/2007 | Bono | ............. | 718/100 |

2003/0195748 A1 * 10/2003 Schalkwyk ................. 704/231

FOREIGN PATENT DOCUMENTS

EP    735476 A1 * 10/1996

(Continued)

OTHER PUBLICATIONS

Akeret, Rene et al; "AIX 5L Differences Guide", Version 5.1 Edition, Japan, IBM Japan, Jan. 2002, The first edition, pp. 476-477.

*Primary Examiner*—Thomas Lee
*Assistant Examiner*—Camquy Truong
(74) *Attorney, Agent, or Firm*—Martin & Associates, LLC; Derek P. Martin

(57) ABSTRACT

A thread dispatch mechanism dispatches threads in a multi-processor computer system that has hardware multithreading enabled, thereby allowing each processor to execute multiple threads. The thread dispatch mechanism determines which processors are busy and cannot execute an additional thread, which processors are working on a thread but can still accept an additional thread, and which processors are idle. As threads are ready to be dispatched, each is dispatched to an idle processor instead of a processor that is already working on another thread. If there are no idle processors, the thread is dispatched to a processor working on one or more threads that can still process the new thread. In this manner the thread dispatch mechanism and method of the present invention provides greatly improved consistency in response times between threads and higher throughput compared to prior art methods of dispatching threads.

9 Claims, 5 Drawing Sheets

FOREIGN PATENT DOCUMENTS

| | | |
|---|---|---|
| JP | 58115569 | 7/1983 |
| JP | 01246657 | 10/1989 |
| JP | 06060043 | 3/1994 |
| JP | 08292932 | 11/1996 |
| JP | 2684993 | 8/1997 |
| JP | 09293057 | 11/1997 |
| JP | 10027168 | 1/1998 |
| JP | 2954056 | 7/1999 |
| JP | 11212929 | 8/1999 |
| JP | 11259318 | 9/1999 |
| JP | 2998648 | 11/1999 |
| JP | 2000181729 | 6/2000 |
| JP | 2000305906 | 11/2000 |

\* cited by examiner

THREAD DISPATCH FOR MULTIPROCESSOR COMPUTER SYSTEMS

BACKGROUND OF THE INVENTION

1. Technical Field

This invention generally relates to computer systems, and more specifically relates to multiprocessor computer systems.

2. Background Art

Since the dawn of the computer age, computer systems have evolved into extremely sophisticated devices, and computer systems may be found in many different settings. Computer systems typically include a combination of hardware, such as semiconductors and circuit boards, and software, also known as computer programs. As advances in semiconductor processing and computer architecture push the performance of the computer hardware higher, more sophisticated computer software has evolved to take advantage of the higher performance of the hardware, resulting in computer systems today that are much more powerful than just a few years ago.

The performance of a computer system depends on many factors that are determined by hardware, software, and other dynamic considerations such as total number of programs being processed, network traffic load, cache efficiency, etc. One known way to increase the performance of the computer system is to provide multiple threads of execution that can process different portions of a computer program. Another known way to increase the performance of a computer system is to provide multiple processors that can share the processing load by executing portions of a computer program or separate computer programs in parallel. The concepts of multithreading and multiple processors can be combined to achieve further increases of performance. In the prior art, multiple processors were originally allowed to execute only one thread of execution at a time. However, more recent advances have allowed multiple threads of execution on each processor in a multiprocessor system. For example, the iSeries Condor computer system manufactured and sold by the IBM Corporation includes setup parameters that allow hardware multithreading to be enabled or disabled. When enabled, each processor can execute two threads. However, certain problems have arisen due to the presence of hardware multithreading.

Modem computer servers must typically support Java. One important benchmark that has been developed to measure how effectively a server supports Java is known as SPECJBB2000. SPEC is an acronym for Standard Performance Evaluation Corporation, which is a standards organization that has a mission to establish, maintain, and endorse a standardized set of relevant benchmarks and metrics for performance evaluation of modem computer systems. JBB2000 is an acronym for Java Business Benchmark, and is a benchmark that was made available in June of 2000. SPECJBB2000 has become very widely accepted in the industry as a desirable benchmark to meet. However, the enabling of hardware multithreading on systems that support it will usually cause the system to fail the SPECJBB2000 benchmark. The reason for the failure is that SPECJBB2000 has a specification of maximum variance between the execution time and transaction processing rate of different threads, commonly known in the industry as "thread spread". If the execution time or transaction processing rate of different threads doing similar tasks exceeds the specified maximum thread spread, the benchmark fails. Most modem computer systems that include hardware multithreading fail executing the SPECJBB2000 benchmark due to excessive thread spread. As a result, most computer vendors turn off hardware multithreading when running the SPECJBB2000 benchmark. The cause of the excessive thread spread is the manner in which the operating system dispatches threads to available processors. Without an improved thread dispatch mechanism and method that reduces the thread spread, the computer industry will continue to suffer from computer systems that have excessive thread spread (and thus, cannot meet the SPECJBB2000 benchmark) unless hardware multithreading is disabled, which eliminates the performance advantage of providing hardware multithreading in the first place.

DISCLOSURE OF INVENTION

According to the preferred embodiments, a thread dispatch mechanism dispatches threads in a multiprocessor computer system that has hardware multithreading enabled, thereby allowing each processor to execute multiple threads. The thread dispatch mechanism determines which processors are busy and cannot execute an additional thread, which processors are working on a thread but can still accept an additional thread, and which processors are idle. As threads are ready to be dispatched, they are first dispatched to an idle processor instead of a processor that is already working on another thread. If there are no idle processors, the thread is dispatched to a processor working on one or more threads that can still process the new thread. In this manner the thread dispatch mechanism and method of the present invention provides greatly improved consistency in response times between threads and higher throughput compared to prior art methods of dispatching threads.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and.

BEST MODE FOR CARRYING OUT THE INVENTION

1.0 Overview

Figure 1:
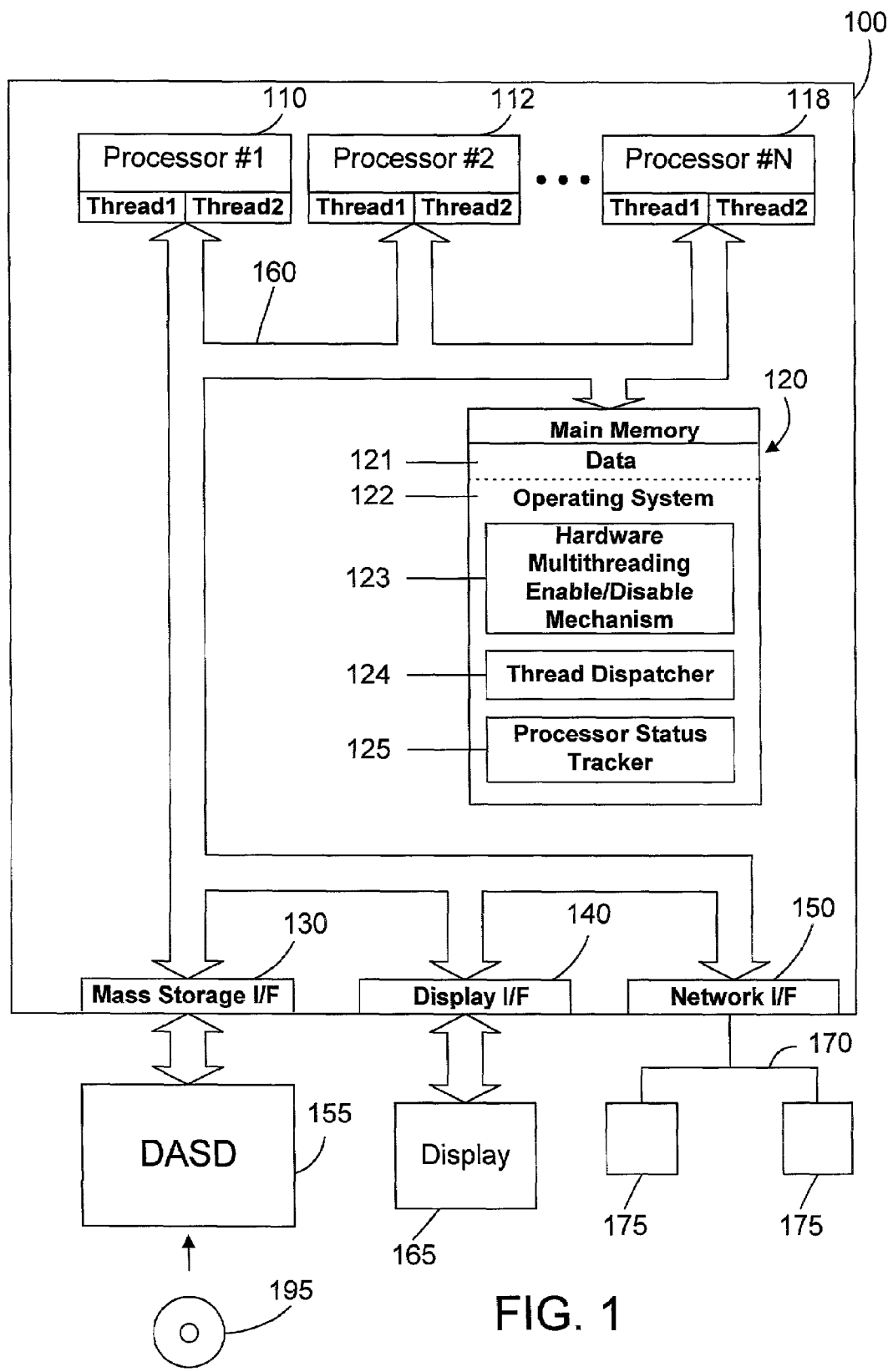
FIG. 1 is a block diagram of an apparatus in accordance with the preferred embodiments.

The present invention relates to the dispatching of threads in a multiprocessor computer system that has hardware multithreading enabled. For those not familiar with multithreaded systems, multiprocessor systems, hardware multithreading, and prior art thread dispatch mechanisms and methods, this Overview section will provide background information that will help to understand the present invention.

Multithreaded Systems

Computer systems have been developed that allow multiple threads of execution (or tasks) to be executed at the same time. In a single processor system, the multiple threads cannot be truly executed at the same time, because only a single processor exists. However, multithreading in a single processor system allows the system to be multitasking. The CPU scheduler in a single processor system controls the switching between threads, making it appear that the threads run simultaneously, and allowing the CPU to work on multiple tasks at the same time.

Multiprocessor Systems

The raw processing power of a computer system may be increased by providing multiple processors that can work on different tasks at the same time. Early multiprocessor systems would assign a single thread to each processor. The thread dispatchers known in the prior for multiprocessor systems that support a single thread on each processor can operate in a number of different ways. The most common known way is to assign threads to processors in a sequential manner. In this type of system, the first thread is dispatched to the first processor; the second thread is dispatched to the second processor, etc. If all processors are busy executing threads, the next thread to be dispatched will have to wait until a processor becomes available. Another known way to dispatch threads is to pick a processor at random and to assign a thread to that processor, provided it is not busy executing another thread. Yet another known way to dispatch threads is to pick the processor that executed the thread the last time it ran. This type of dispatching is based on processor affinity, with the hope that the processor that executed the thread last may have its cache already loaded with needed information. Each of these thread dispatch methods were developed in multiprocessor systems that only allow a single thread to be executed on each processor.

Hardware Multithreading

More recent developments brought about the concept of hardware multithreading, which allows multiple threads to be executed by each processor in a multiprocessor system. The thread dispatchers in these systems use the same methods used in previous systems when hardware multithreading was not present, namely: sequential, random, and processor affinity. The result of dispatching threads in the same manner in a system that includes hardware multithreading is that the variability of execution time and transaction processing rate between threads (i.e., "thread spread") may become excessive. For example, if a second thread is dispatched to a processor that is already executing another thread, the execution time for the second thread will typically be significantly longer than if the second thread were dispatched to an idle processor that is not executing any threads. The issue of thread spread is important for several different reasons. First, excessive thread spread leads to inconsistent response times. If a computer operator is taking orders on the phone and entering the orders into a computer system, the operator will become frustrated if the time to process an order widely varies from one time to the next. If the computer system takes one second to process an order one time, a tenth of a second the next time, and five seconds the next, the operator will often get frustrated at the inconsistent response time of the computer system. Consistency of response time in this context is more important than the value of the response time. So long as the system acts the same way each time, within the limits of human perception by the user, the user is satisfied that the computer system is functioning properly.

Another reason that minimizing thread spread is important is to allow a computer system to pass benchmarks such as SPECJBB2000. SPECJBB2000 is a prestigious benchmark in the computer industry that manufacturers want to meet to prove how effectively their servers process Java code.

Yet another reason that minimizing thread spread is important relates to how applications have evolved over time. For applications that have intensive I/O, the thread spread is not as critical an issue, because the time slices between I/O operations are relatively small, and thus do not greatly impact human perception or system performance. However, many more modern applications, such as Java applications, run with many more CPU cycles per I/O operation, and the result is that the differences in thread execution time can significantly impact the performance of the computer system. For example, let's assume that a company does batch processing at night, and the batch processing must be completed by 8:00 AM when the employees return to work. The thread spread could cause one thread to complete at 5:00 AM while another thread does not complete until 9:00 AM. In this case, the average processing time between the two threads results in both threads being completed at 7:00 AM. However, the thread spread produces unacceptable results, because the batch processing will not be completed by the second thread when the employees return to work at 8:00 AM. For this reason, consistency of execution time and transaction processing rate between threads (i.e., smaller thread spread) is important to many modern applications. The present invention greatly reduces the thread spread in a multiprocessor system that has hardware multithreading enabled.

2.0 Detailed Description

The preferred embodiments provide a mechanism and method of dispatching threads in a multiprocessor system that has hardware multithreading enabled that greatly reduces thread spread (i.e., the variability of execution time and transaction processing rate between threads). This is done by monitoring processors to determine which are idle, which are busy processing one or more threads but could still accept another thread, and which are already busy processing the maximum number of threads. When a thread needs to be dispatched, it is dispatched to an idle processor, if present. If there is no idle processor, the thread is dispatched to a processor that is executing the fewest threads. In this manner, the variance of time to execute different threads is significantly reduced, allowing a multiprocessor system in accordance with the preferred embodiments with hardware multithreading enabled to pass the SPECJBB2000 benchmark and to provide more consistent response times and throughput between threads.

Referring to FIG. 1, a computer system 100 is one suitable implementation of an apparatus in accordance with the preferred embodiments of the invention. Computer system 100 is an IBM iSeries computer system, specifically a Condor computer system that support hardware multithreading. However, those skilled in the art will appreciate that the mechanisms and apparatus of the present invention apply equally to any computer system, regardless of whether the computer system is a complicated multi-user computing apparatus, a single user workstation, or an embedded control system. As shown in FIG. 1, computer system 100 comprises multiple processors (such as processors 110, 112 and 118), a main memory 120, a mass storage interface 130, a display interface 140, and a network interface 150. These system components are interconnected through the use of a system bus 160. Mass storage interface 130 is used to connect mass storage devices (such as a direct access storage device 155) to computer system 100.

One specific type of direct access storage device 155 is a readable and writable CD ROM drive, which may store data to and read data from a CD ROM 195.

Main memory 120 in accordance with the preferred embodiments contains data 121 and an operating system 122. Data 121 represents any data that serves as input to or output from any program in computer system 100. Operating system 122 is similar to a multitasking operating system known in the industry as OS/400; however, those skilled in the art will appreciate that the spirit and scope of the present invention is not limited to any one operating system. The operating system 122 of the preferred embodiments includes a hardware multithreading enable/disable mechanism 123 that allows a system administrator to turn hardware multithreading on or off. In the context of the iSeries Condor computer system, enabling hardware multithreading means that each processor can execute two threads. With hardware multithreading disabled, each processor can only execute one thread. Operating system 122 includes a thread dispatcher 124 that dispatches threads to the available processors in a way that minimizes the variability of time to execute different threads. Operating system 122 also includes a processor status tracker 125 that tracks the status of all the processors (e.g., 110, 112, . . . , 118) in the system.

Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while data 121 and operating system 122 are shown to reside in main memory 120, those skilled in the art will recognize that these items are not necessarily all completely contained in main memory 120 at the same time. It should also be noted that the term "memory" is used herein to generically refer to the entire virtual memory of computer system 100, and may include the virtual memory of other computer systems coupled to computer system 100.

Each processor (e.g., 110, 112, . . . , 118) may be constructed from one or more microprocessors and/or integrated circuits. Each processor executes program instructions stored in main memory 120. Main memory 120 stores programs and data that each processor may access. When computer system 100 starts up, one of the processors initially executes the program instructions that make up operating system 122. Operating system 122 is a sophisticated program that manages the resources of computer system 100. Some of these resources are processor 110, main memory 120, mass storage interface 130, display interface 140, network interface 150, and system bus 160.

Although computer system 100 is shown to contain only a single system bus, those skilled in the art will appreciate that the present invention may be practiced using a computer system that has multiple buses. In addition, the interfaces that are used in the preferred embodiment each include separate, fully programmed microprocessors that are used to off-load compute-intensive processing from the processors. However, those skilled in the art will appreciate that the present invention applies equally to computer systems that simply use I/O adapters to perform similar functions.

Display interface 140 is used to directly connect one or more displays 165 to computer system 100. These displays 165, which may be non-intelligent (i.e., dumb) terminals or fully programmable workstations, are used to allow system administrators and users to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect other computer systems and/or workstations (e.g., 175 in FIG. 1) to computer system 100 across a network 170. The present invention applies equally no matter how computer system 100 may be connected to other computer systems and/or workstations, regardless of whether the network connection 170 is made using present-day analog and/or digital techniques or via some networking mechanism of the future. In addition, many different network protocols can be used to implement a network. These protocols are specialized computer programs that allow computers to communicate across network 170. TCP/IP (Transmission Control Protocol/Internet Protocol) is an example of a suitable network protocol.

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of computer-readable signal bearing media used to actually carry out the distribution. Examples of suitable computer-readable signal bearing media include: recordable type media such as floppy disks and CD ROM (e.g, 195 of FIG. 1), and transmission type media such as digital and analog communications links.

Figure 2:
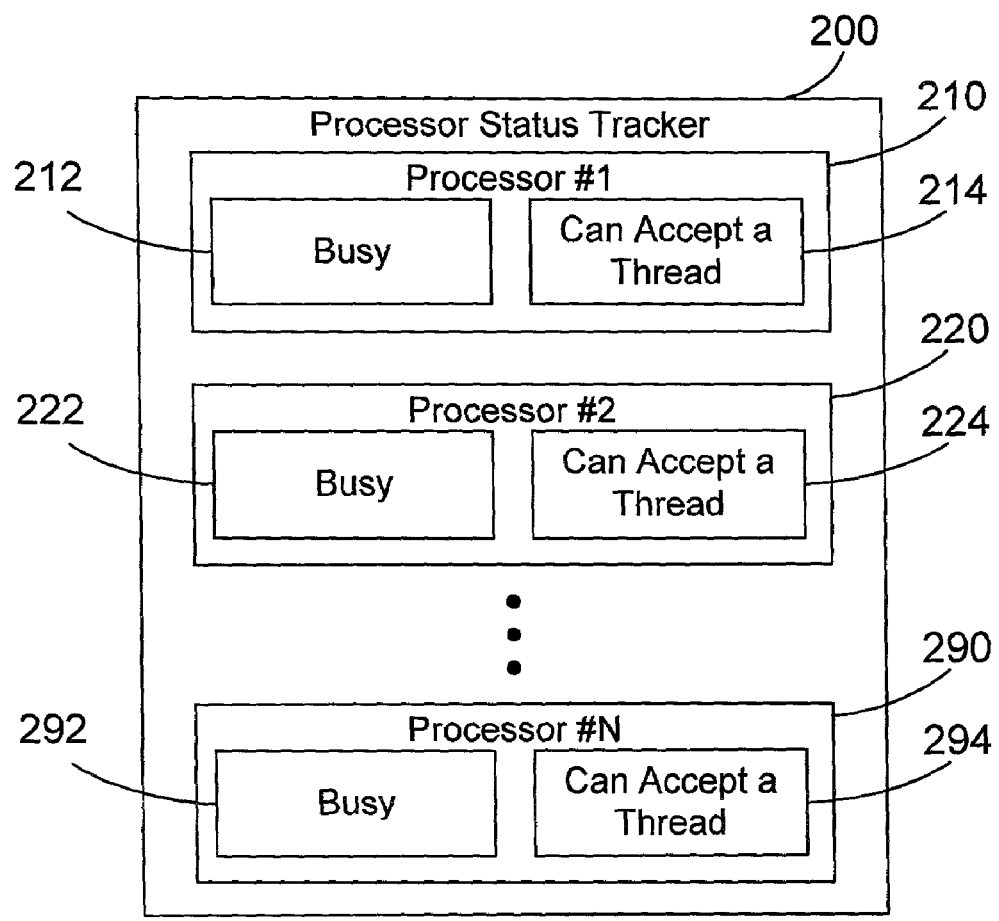
FIG. 2 is block diagram showing how processor status is tracked in prior art thread dispatch mechanisms.

The remainder of this specification describes the detailed function of prior art thread dispatchers and compares their function with the function of the thread dispatcher 124 shown in FIG. 1. As shown in FIG. 1, the thread dispatcher 124 of the preferred embodiments operates according to the status of the processors as indicated by a processor status tracker 125, which keeps track of the status of each processor in the system. Referring to FIG. 2, in the prior art, a processor can have only two states: 1) busy, meaning that the processor cannot take another thread, or 2) can accept a thread, meaning that the processor is available to take a thread. Note that these are mutually-exclusive states. A processor is either busy, or able to accept a thread. In the case of a prior art multiprocessor iSeries computer system that has hardware multithreading disabled, a processor is busy when executing one thread, and can accept a thread if it is not executing a thread. For the same iSeries computer system that has hardware multithreading enabled, a processor is busy if it is executing two threads, and can accept a thread if it is either 1) processing one thread, or 2) idle. What is significant in the prior art is that no distinction is made between processing one thread (meaning that the processor can accept one more thread), and idle (meaning that the processor can accept two threads). Both cases are lumped together in the status of "can accept a thread", as shown in FIG. 2. Processor #1 210 has a status of either busy 212 or can accept a thread 214. Processor #2 220 has a status of either busy 222 or can accept a thread 224. Processor #N 290 has a status of either busy 292 or can accept a thread 294. All other processors in a prior art system will have the same two status states.

Figure 3:
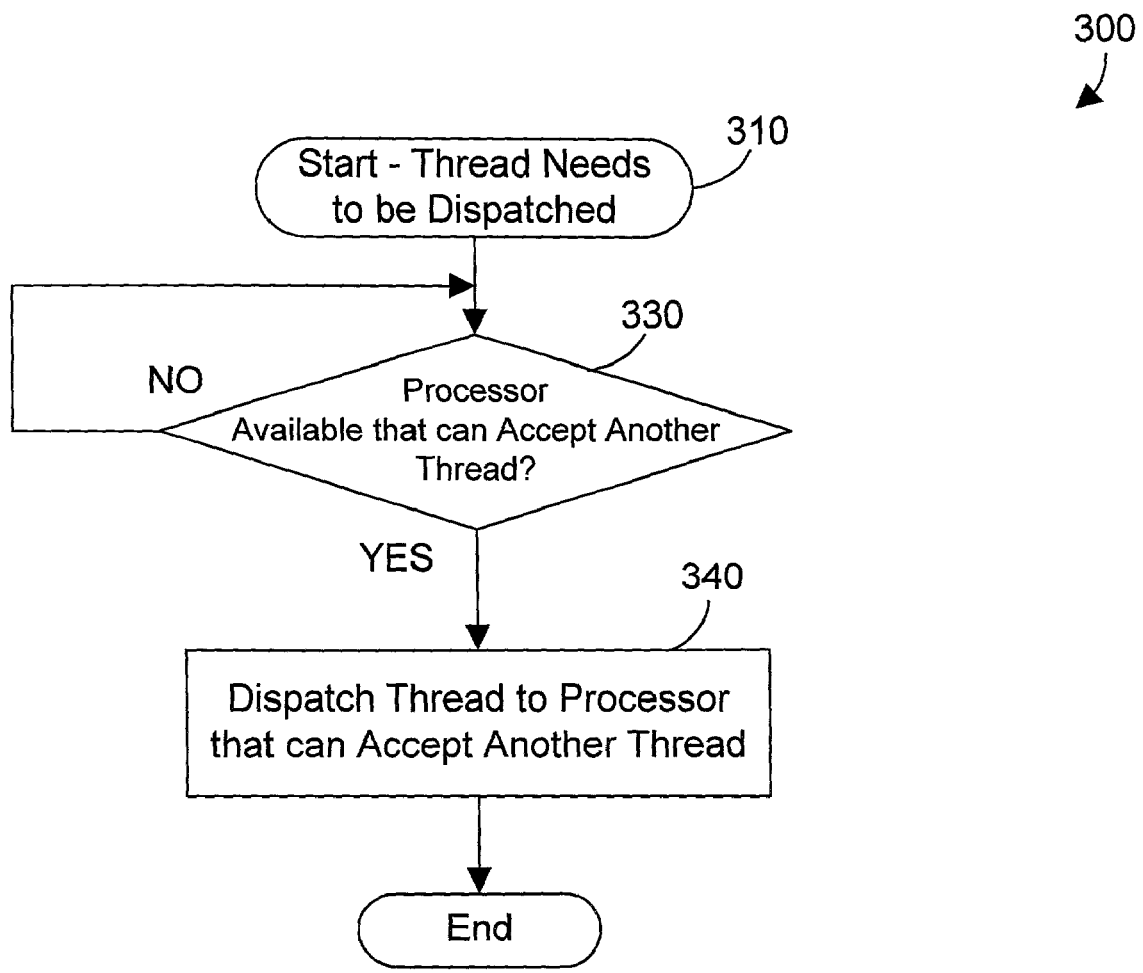
FIG. 3 is a flow diagram of a prior art method for dispatching threads in a multiprocessor environment with hardware multithreading enabled.

We now review a prior art method 300 in FIG. 3 for dispatching threads in a prior art multiprocessor computer system. Method 300 starts when a thread needs to be dispatched (step 310). If a processor is available that can accept another thread (step 330=YES), the thread is dispatched to one of the processors that can accept another thread (step 340). If no processor is available that can accept another thread (step 330=NO), method 300 loops back until a processor finishes the processing of a thread and can accept another thread (step 330=YES). Prior art method 300 is representative of prior art systems whether or not they have hardware multithreading enabled. For the iSeries computer system, if hardware multithreading is disabled, each processor can only process a single thread. If hardware multithreading is enabled, each processor can process two threads. If a processor is idle, it can accept two threads. If a processor is executing one thread, it can still accept another thread. Thus, the YES branch of step 330 makes no distinction between a processor that is executing one thread and a processor that is not processing any threads. As a result, the dispatching of the thread in step 340 only looks to see whether the processor can still take one more thread. This can lead to dispatching threads to processors that are already executing a thread, even though many idle processors may be available.

There are three known heuristics that are used in the prior art for dispatching a thread in step 340 in a multiprocessor computer system that has hardware multithreading enabled. The first is a sequential dispatch scheme that sequentially assigns threads to processors if they are able to take another thread. For the sake of example, we assume that initially no threads are executing. In this sequential scheme, the thread dispatcher dispatches the first thread to the first processor. When the thread dispatcher receives the second thread, it sees that the first processor can still take another thread, so it assigns the second thread to the first processor. At this point, the first processor is busy executing the first and second threads, so the third thread is dispatched to the second processor. Assuming the first three threads are still executing when the fourth thread is dispatched, the fourth thread will be dispatched to the second processor. This continues, with each processor receiving two threads before the next processor in sequence receives any threads. The result is excessive thread spread (i.e., variability in execution time and transaction processing rate between threads).

A second known thread dispatch scheme randomly selects a processor that can take another thread, and dispatches a thread to the processor. Again, this scheme often results in a processor receiving two threads before other processors that are idle receive any threads, resulting in excessive thread spread.

A third known thread dispatch scheme is based on processor affinity, and selects the processor that previously processed the thread, with the hope that performance advantages may be achieved by taking advantage of data that may reside in the cache from the last time the processor executed the thread. This scheme suffers from the same drawbacks as the other two schemes discussed above, that a processor may still receive two threads before other processors that are idle receive any threads, resulting in excessive thread spread. Any of these three known dispatching schemes could be used in step 340 of FIG. 3. All of these suffer from excessive thread spread because they do not distinguish between a processor that is already processing one thread and a processor that is idle.

Figure 4:
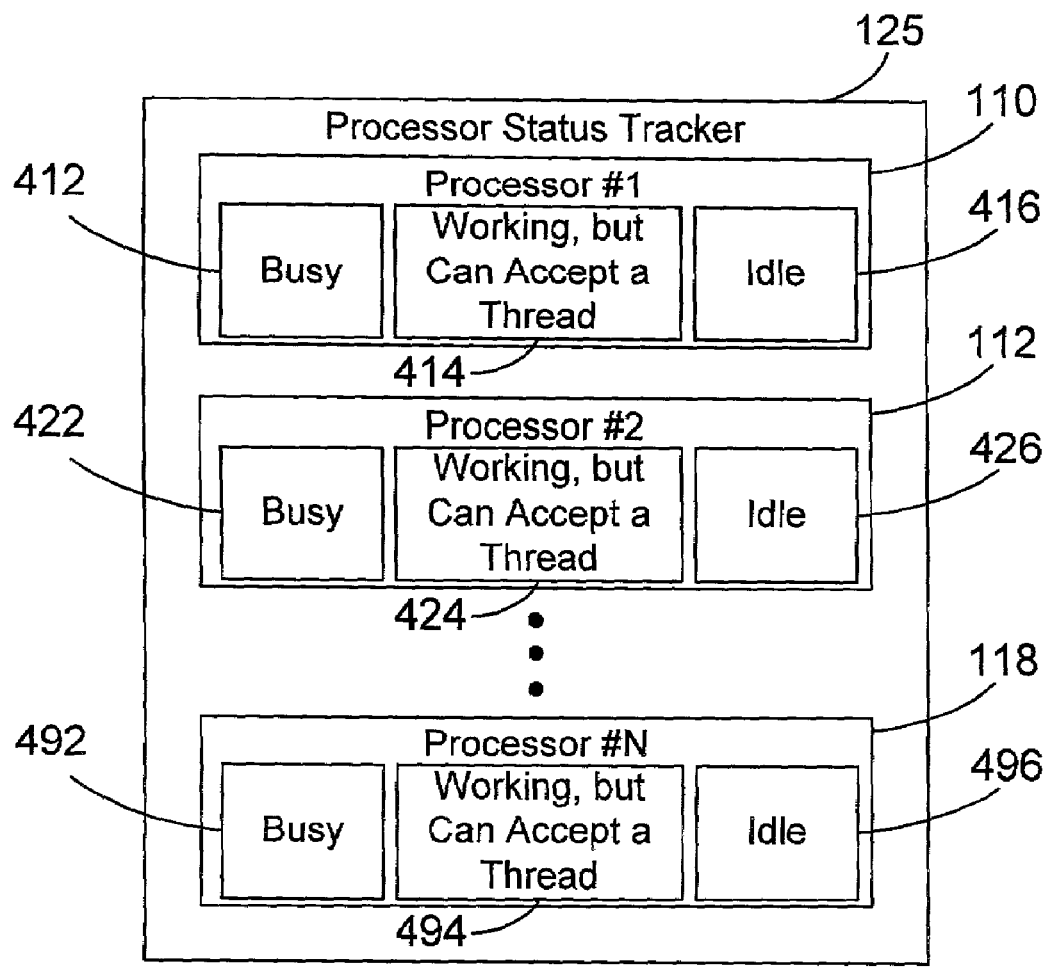
FIG. 4 is a block diagram showing how processor status is tracked in the thread dispatch mechanism in accordance with the preferred embodiments.

Referring to FIG. 4, a processor status tracker 125 in accordance with the preferred embodiments tracks three possible states for each processor, namely: 1) busy, which means that the processor cannot accept any more threads; 2) working, but can accept a thread, which means that the processor is already executing a thread, but can still accept another; and 3) idle, indicating that the processor is not currently executing any thread. Thus, in FIG. 4, processor #1 110 may have a state of busy 412; working, but can accept a thread 414; or idle 416. Similarly, processor #2 112 may have one of the same three states 422, 424, or 426; processor #N 118 may have one of the same three states 492, 494 or 496; and any other processor may have one of the same three states.

Figure 5:
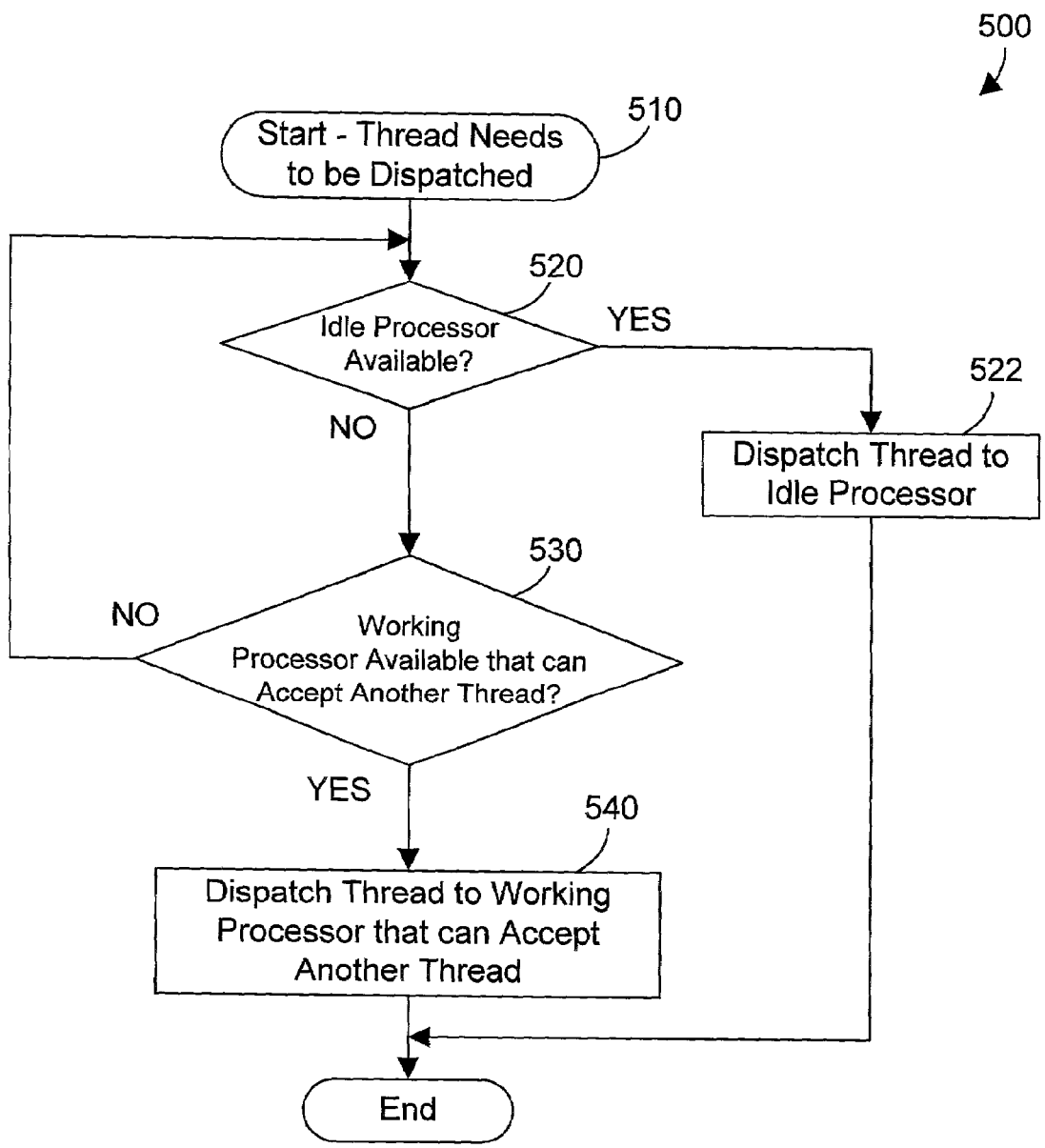
FIG. 5 is a flow diagram of a method for dispatching threads in a multiprocessor system with hardware multithreading enabled in accordance with the preferred embodiments.

Now that the processor status tracker 125 tracks the difference between an idle processor and a processor that is already processing a thread, but could process another one, the thread dispatcher 124 can now make more intelligent decisions when dispatching threads to reduce thread spread. Referring to FIG. 5, a method 500 in accordance with the preferred embodiments is preferably performed by the thread dispatcher 124 shown in FIG. 1. Method 500 starts when a thread needs to be dispatched (step 510). If an idle processor is available (step 520), the thread is dispatched to an idle processor (step 522). If no idle processor is available, but there is a working processor that can accept another thread (step 530=YES), the thread is dispatched to one of the working processors that can accept another thread (step 540). If there is no idle processor available (step 520=NO), and if none of the processors can accept another thread (step 530=NO), method 500 loops back until one of the processors completes the execution of one of its threads and can therefore accept another thread.

Method 500 is a significant improvement over the prior art because all idle processors are made busy before dispatching a second thread to any processor. An idle processor typically can process a thread more quickly than a processor that has to work on two threads at the same time. For this reason, thread dispatcher 124 greatly improves the performance of computer system 100, and more significantly, reduces the thread spread to the point that computer system 100 can pass the SPECJBB2000 benchmark test with hardware multithreading enabled, and can provide more consistent execution time and transaction processing rate between threads. The result of reducing the thread spread is that users will be more satisfied, and performance goals relating to throughput and response times may be more easily met.

The preferred embodiments described herein provide a way to more efficiently dispatch threads by distinguishing between idle processors and processors that are working on a thread but can still accept another thread. By dispatching threads to idle processors first, the thread spread is greatly reduced, because a thread is only dispatched to a processor that is already processing a thread when there are no idle processors. This makes for better utilization of processor resources, improving system performance and significantly reducing the thread spread.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention.

What is claimed is:

1. An apparatus for computer hardware multithreading comprising:
   a plurality of processors, each processor having hardware support for the capability of executing a plurality of threads;
   a memory coupled to the plurality of processors;
   a thread dispatch mechanism residing in the memory and executed by at least one of the plurality of processors, the thread dispatch mechanism determining which of the plurality of processors are idle, which of the plurality of processors is busy processing a thread but can accept a new thread, and which of the plurality of processors cannot accept the new thread since it is working on a maximum number of threads the processor can execute and, the thread dispatch mechanism dispatching the new thread to an idle processor, if one exists; and wherein all processors are made busy with a first thread before dispatching a second thread to any processor.

2. The apparatus of claim 1 wherein, if none of the plurality of processors is idle and if at least one of the plurality of processors can accept the new thread, the thread dispatch mechanism dispatches the new thread to one of the plurality of processors that can accept the new thread.

3. The apparatus of claim 1 wherein, if all of the plurality of processors cannot accept the new thread, the thread dispatch mechanism waits for one of the plurality of processors to complete processing a thread, thereby becoming a processor that can accept the new thread, and then dispatches the thread to the processor that can accept the new thread.

4. A method for dispatching threads in a computer system that includes a plurality of processors that can each support hardware multithreading to execute a plurality of threads, the method comprising the steps of:
   (1) determining the status of each of the plurality of processors, wherein a processor is idle if not executing any threads, wherein the processor can accept a new thread if busy working on one or more threads but has the capacity to process the new thread, and wherein the processor cannot accept the new thread if busy working on a maximum number of threads the processor can execute; and
   (2) dispatching the new thread to an idle processor, if one exists, and
   wherein all processors are made busy with a first thread before dispatching a second thread to any processor.

5. The method of claim 4 further comprising the step of:
   if none of the plurality of processors is idle and if at least one of the plurality of processors can accept the new thread, the thread dispatch mechanism dispatches the new thread to one of the plurality of processors that can accept the new thread.

6. The method of claim 4 further comprising the steps of:
   if all of the plurality of processors cannot accept the new thread, the thread dispatch mechanism waits for one of the plurality of processors to complete processing a thread, thereby becoming a processor that can accept the new thread, and then dispatches the thread to the processor that can accept the new thread.

7. A computer-readable program product having storage media for storing a thread dispatch mechanism when executed by processor perform the step of:
   determining which of a plurality of processors in a hardware multithreading, multiprocessor computer system are idle, which of the plurality of processors is busy but can accept a new thread, and which of the plurality of processors cannot accept the new thread since it is working on a maximum number of threads the processor can execute, the thread dispatch mechanism dispatching the new thread to an idle processor, if one exists, wherein each processor can execute a plurality of threads; and
   wherein all processors are made busy with a first thread before dispatching a second thread to any processor.

8. The program product of claim 7 wherein, if none of the plurality of processors is idle and if at least one of the plurality of processors can accept the new thread, the thread dispatch mechanism dispatches the new thread to one of the plurality of processors that can accept the new thread.

9. The program product of claim 7 wherein, if all of the plurality of processors cannot accept the new thread, the thread dispatch mechanism waits for one of the plurality of processors to complete processing a thread, thereby becoming a processor that can accept the new thread, and then dispatches the new thread to the processor that can accept the new thread.

* * * * *